United States Patent [19]

Schanz et al.

[11] Patent Number: 4,815,580
[45] Date of Patent: Mar. 28, 1989

[54] INTERMEDIATE STORAGE STATION

[75] Inventors: Rainer Schanz, Stuttgart; Paul Baumbusch, Grossbottwar; Harald Egner, Stuttgart, all of Fed. Rep. of Germany

[73] Assignee: SKF GmbH, Schweinfurt, Fed. Rep. of Germany

[21] Appl. No.: 123,189

[22] Filed: Nov. 20, 1987

[30] Foreign Application Priority Data

Nov. 20, 1986 [DE] Fed. Rep. of Germany ....... 3639706

[51] Int. Cl.$^4$ ................................................. B65G 1/00
[52] U.S. Cl. .................................... 198/347; 198/435; 198/453; 198/454; 198/803.16
[58] Field of Search ............... 198/347, 443, 434, 435, 198/453, 454, 455, 803.16, 367; 414/331, 223, 59, 42

[56] References Cited

U.S. PATENT DOCUMENTS

| | | | |
|---|---|---|---|
| 2,541,300 | 2/1951 | Silva | 198/455 |
| 2,642,173 | 6/1953 | Wehmiller et al. | 198/367 |
| 2,763,400 | 9/1956 | Francis | 198/803.16 X |
| 2,881,897 | 4/1959 | Thulke | 198/453 X |
| 3,358,831 | 12/1967 | Cothrell | 198/347 X |
| 3,580,141 | 5/1971 | Richter | 198/435 X |
| 3,623,596 | 11/1971 | Garvey | 198/347 |
| 3,682,331 | 8/1972 | Fetherston | 414/331 |
| 3,848,724 | 11/1974 | Belk | 198/803.16 X |
| 4,712,963 | 12/1987 | Kondo | 414/331 X |

FOREIGN PATENT DOCUMENTS

| | | |
|---|---|---|
| 3247899 | 4/1984 | Fed. Rep. of Germany . |
| 208419 | 7/1968 | U.S.S.R. .............................. 198/434 |
| 980963 | 1/1965 | United Kingdom ............... 198/426 |
| 2030124 | 4/1980 | United Kingdom ............... 198/453 |

Primary Examiner—Robert J. Spar
Assistant Examiner—D. Glenn Dayoan
Attorney, Agent, or Firm—Rosen, Dainow & Jacobs

[57] ABSTRACT

A storage station for receiving workpieces from a loading conveyor belt and for sending workpieces to an unloading conveyor belt. The station has a plurality of spaced platforms mounted on a common rotatable shaft, and apparatus for adjusting the vertical position relative to the rotary platforms of the ends of the loading and unloading conveyor belts which are proximal to the station. A first guide is provided for each platform for directing workpieces riding on the outer radial region of the respective platform toward the inner radial region of that platform when the first guide is in a first position. The first guide is pivotally mounted at a point overlying the periphery of the respective platform and positioned downstream of the proximal end of the loading conveyor belt, and a movable end of the first guide is displaceable from a relatively inner radial position corresponding to the first position toward a relatively outer radial position when the first guide swings radially outwardly from the first position to a second position as the platform is filled with workpieces. A mechanism is provided for each first guide for resisting the radially outward swinging of the first guide during loading. A second guide is provided for each platform for directing workpieces from the respective platform to the proximal end of the unloading conveyor belt.

12 Claims, 5 Drawing Sheets

INTERMEDIATE STORAGE STATION

FIELD OF THE INVENTION

This invention relates to an intermediate storage station for storing workpieces, preferably workpieces which are symmetric with respect to an axis, which are automatically fed thereto and discharged therefrom by conveyor belts or substantially equivalent means.

BACKGROUND OF THE INVENTION

An arrangement of the foregoing type is disclosed in DE-OS No. 3247899. This prior art reference teaches that workpieces at one processing station are conveyed to another processing station or an inventory storage by way of an intermediate storage station. This avoids the necessity of storing workpieces in bulk material boxes, whereby the workpieces can become tilted in the loading process, so that damage to the workpieces and excessive noise can be avoided.

In practice, however, this arrangement has proven to be defective because the throughput of the corresponding piece count is less than optimum. Also in this prior art arrangement a change in the plane of workpiece storage is not possible.

BRIEF SUMMARY OF THE INVENTION

The object of the invention is to overcome the aforementioned disadvantages by simple measures which achieve a high speed for the loading and unloading of workpieces and ensure a simple actuation of the individual elevation-adjusting mechanisms.

This object is achieved in accordance with the invention by arranging a guide barrier over a rotary platform such that one end thereof is arranged over the periphery of the rotary platform and at a point located downstream of the loading point of the conveyor belt, that is, in the path of the fed workpieces riding on the rotating platform, and the other end thereof which in the initial state is located in the vicinity of the central shaft rotatably supporting the rotary platform. The guide barrier is supported by an active or passive adjustment mechanism (e.g., adjustment member, spring element, or damping element) by way of a slide. This guide barrier automatically adjusts to the degree of filling of the rotary platform with packed workpieces fed from the loading conveyor belt. During adjustment the guide barrier swings about its one end so that the other end is displaced from the vicinity of the central shaft toward a point overlying the periphery of the rotary platform. In addition, a further guide barrier is adjustably provided for guiding the workpieces to be unloaded.

In this manner a high rate of filling is attained as the workpieces are smoothly guided toward the center of the rotary platform, where they remain substantially stationary relative to the platform. Also a multirow inflow of workpieces is possible. The adjustment of the guide barrier occurs automatically, so that the foregoing relationships always apply.

An advantageous loading is realized by positioning the workpieces on the rotary platform using a guide barrier which is sickle-shaped.

To enable simple adjustment of the guide barrier, the guide barrier can be made of resilient material (e.g., plastic or spring steel).

To improve the rate of unloading, another guide barrier is inserted at an angle oblique relative to the direction of travel of the workpieces when riding on a rotating platform and at a feed angle relative to the conveyor belt. The inclination of the guide barrier relative to the unloading conveyor belt ensures better removal of the radially inner-lying workpieces.

A further increase in the rate of workpiece unloading can be realized by substituting a conveyor belt for the guide barrier, this guiding conveyor belt having rollers with substantially vertical axes of rotation. The guiding conveyor belt rotates in a direction such that the belt portion in frictional contact with the workpieces to be unloaded urges those workpieces toward the unloading point.

In the case where the great weight of a full storage unit makes a fast transition from one rotary platform to another with exact positioning difficult, the conveyor belts for loading and unloading can be vertically adjustable. In one embodiment the conveyor belts can be vertically adjusted between two extreme positions separated by a height equal to the vertical interval between adjacent rotary platforms, while the stationary unit itself is vertically adjustable over a height equal to the vertical distance separating the top and bottom rotary platforms. Alternatively, the conveyor belts can be vertically adjusted over a height equal to the vertical distance separating the top and bottom rotary platforms of a vertically stationary storage unit. In this case each conveyor belt can be moved in steps equal to the height between adjacent rotary platforms, while adjusting the effective length of the conveyor belt so that at each vertical step the end of the conveyor belt is proximal to the periphery of the rotary platform being accessed. The effective length of the conveyor belt can be changed using a tension roller.

BRIEF DESCRIPTION OF THE DRAWINGS

The preferred embodiments of the invention will be described in detail with reference to the drawings, wherein.

DETAILED DESCRIPTION OF THE PREFERRED EMBODIMENTS

Figure 5:
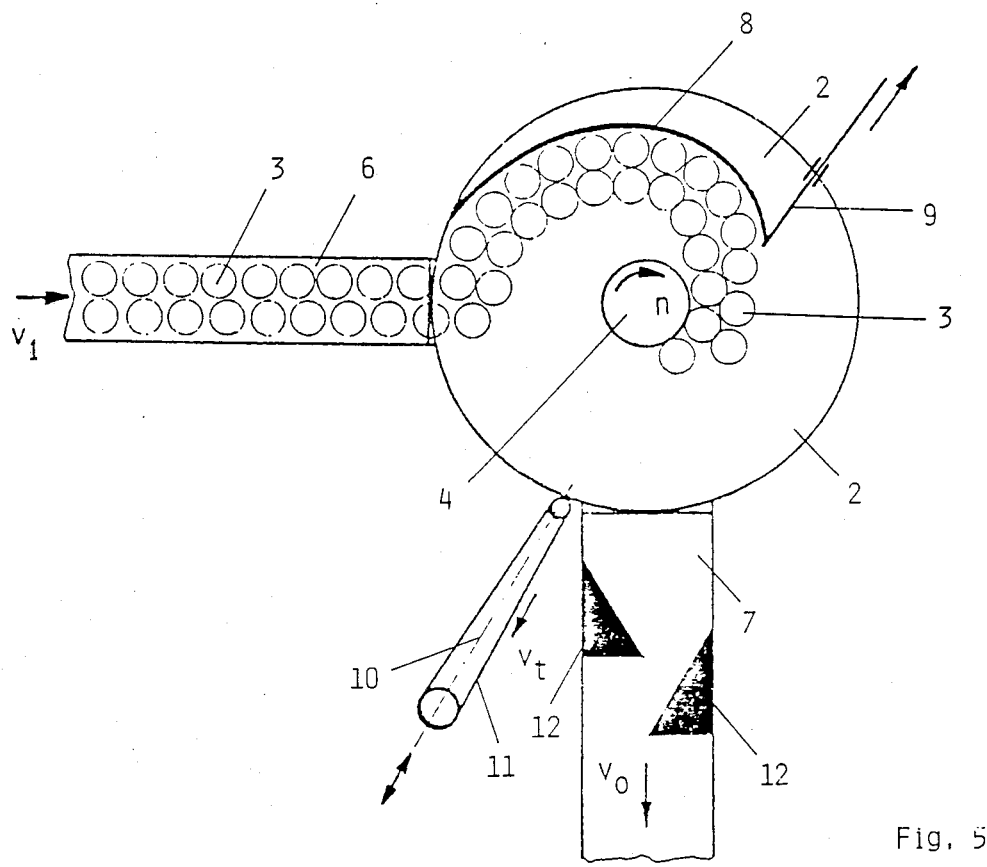
FIG. 5 is a top view of the preferred embodiment depicted in FIGS. 2 and 4.

In the illustrated arrangement (see FIGS. 5 and 6), a movable storage unit 1 is constructed with a plurality of rotary platforms 2 for receiving workpieces 3. It will be obvious to one of ordinary skill that the periphery of each rotary platform has means for preventing workpieces from falling off the platform. The rotary platforms are mounted at intervals along a central shaft 4, which is rotatable about its axis, the rotary platforms being arranged one above the other. The central shaft 4 is rotated by a drive shaft (not shown). The storage unit 1 is set on a vertically adjustable nest 5 which has means (not shown in detail) for driving the central shaft 4 coupled thereto.

Figure 1:
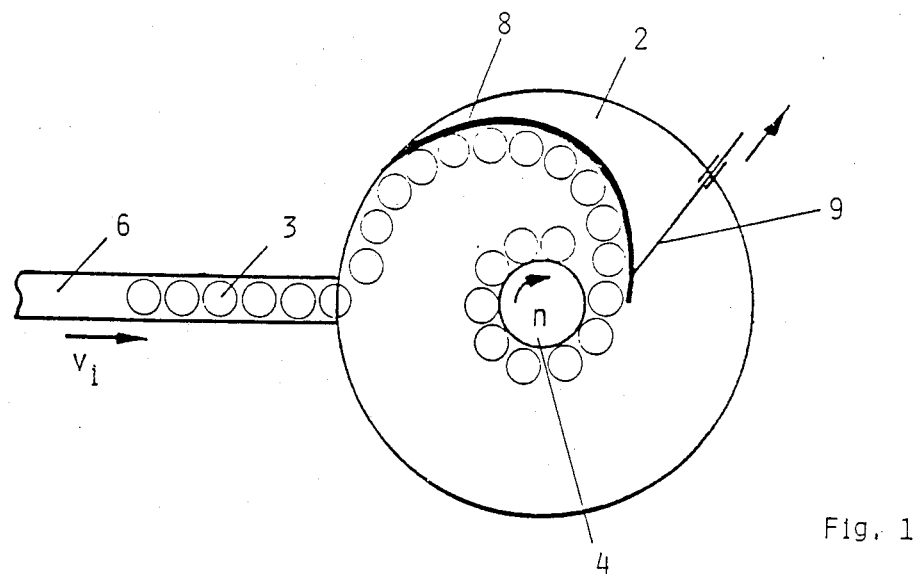
FIG. 1 is a top view of a rotary platform, loading conveyor belt and sickle-shaped loading guide barrier in accordance with a preferred embodiment of the invention.
Figure 2:
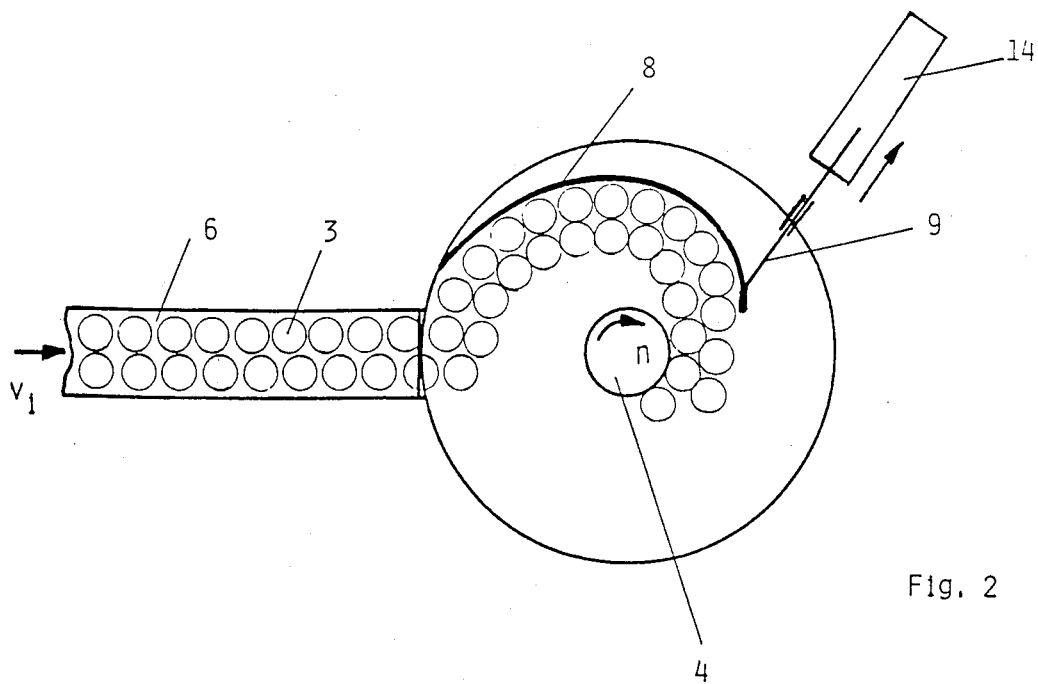
FIG. 2 is a top view of a rotary platform, loading conveyor belt and sickle-shaped loading guide barrier in accordance with another preferred embodiment of the invention.

Conveyor belts 6 and 7 are arranged to respectively load and unload workpieces 3 to and from the storage unit 1. During loading (see FIGS. 1 and 2) the workpieces 3 travel on conveyor belt 6 and are deposited on the rotary platform 3. As the platform rotates, the loaded workpieces initially ride on the periphery of the platform and are then guided toward the center of the rotary platform by sickle-shaped guide barrier 8.

The guide barrier 8 is arranged with one end overlying the periphery of the rotary platform and positioned at a point located downstream of the loading point of the loading conveyor belt 6, that is, in the path of the fed workpieces riding on the rotating platform, and with the other end thereof located in the vicinity of the central shaft 4 rotatably supporting the rotary platform in the initial state. This other end of the guide barrier 8 engages a slide 9 which is connected to an adjustment mechanism 14, for example, a spring element or damping element. The adjustment mechanism 14 resists but does not prevent outward swinging of the guide barrier 8. This arrangement provides a support whereby the guide barrier 8 swings about the one end, the other end moving away from the area of the central shaft 4 toward a point overlying the periphery of the rotary platform 2 in dependence on the extent of filling of the rotary platform with packed workpieces fed from loading conveyor belt 6.

By this construction an advantageous rapid filling of the rotary platform 4 is achieved. In the initial phase of filling, the workpieces 3 are directed to the annular area adjacent the central shaft. Thereafter the guide barrier is urged radially outwardly, away from the central shaft, as the level of filling increases.

Figure 3:
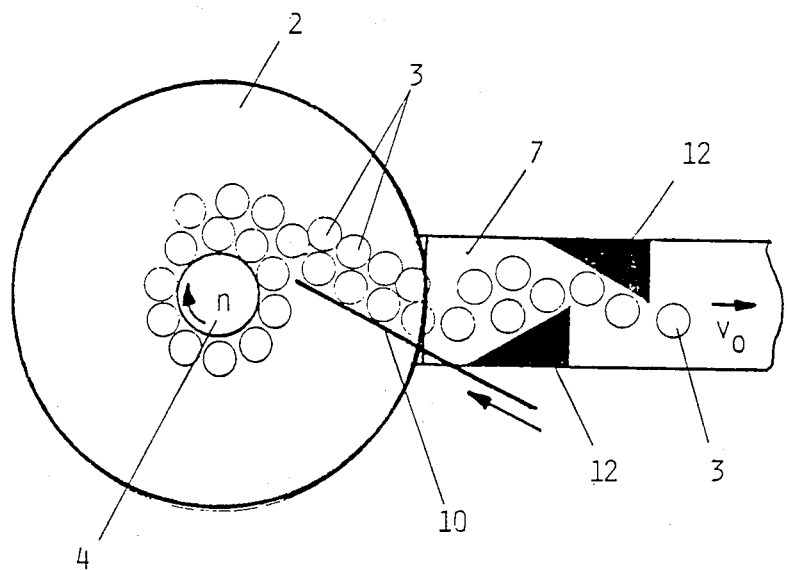
FIG. 3 is a top view of a rotary platform, unloading conveyor belt and unloading guide barrier in accordance with a preferred embodiment of the invention.

During unloading of the workpieces, another guide barrier 10 is inserted at an angle oblique relative to the direction of travel of the workpieces when riding on a rotating platform (see FIG. 3). The guide barrier 10 is arranged at a feed angle relative to the unloading conveyor belt 7. By means of this obliquity of the guide barrier 10 relative to the conveyor belt 7 and the offset of the axis of the guide barrier 10 relative to the axis of rotation of the rotary platform, efficient and rapid unloading of even the radially innermost workpieces is possible.

Figure 4:
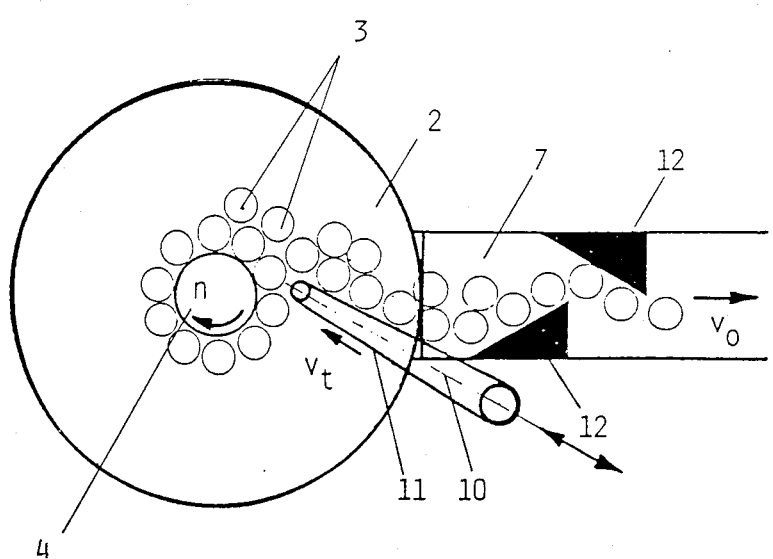
FIG. 4 is a top view of a rotary platform, unloading conveyor belt and unloading guide conveyor belt in accordance with another preferred embodiment of the invention.

In accordance with the embodiment of FIG. 4, the guide means is formed as a conveyor belt 11. The rollers of the guide conveyor belt 11 have vertical axes of rotation, which define a plane 15 offset from the axis of rotation of the central shaft 4.

Triangular guiding elements 12 are arranged over the unloading conveyor belt so as to serve the function of forming a single file of workpieces from several rows of workpieces, which workpieces subsequently travel in single file.

Figure 6:
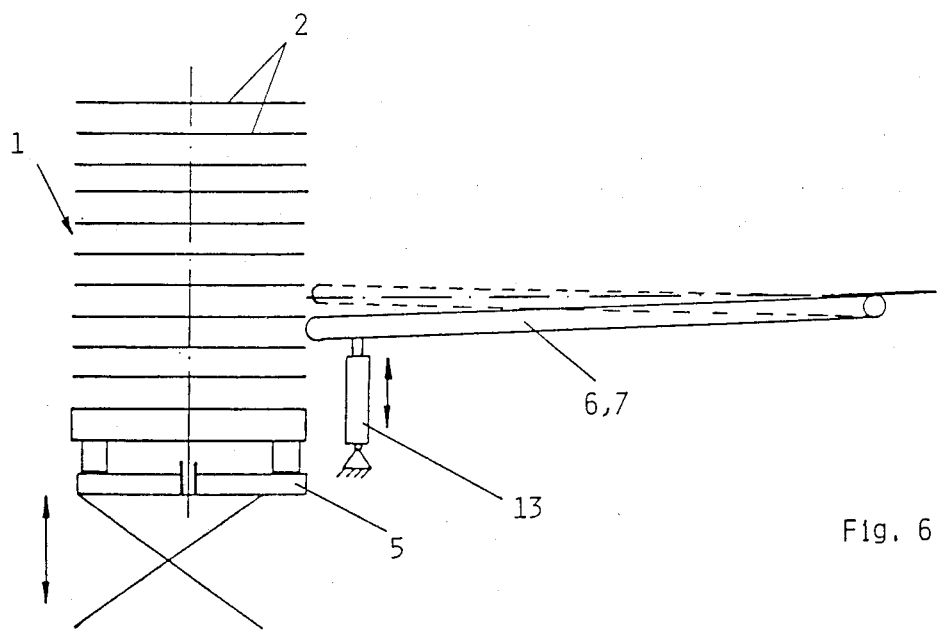
FIG. 6 is a side view of a preferred embodiment of the invention wherein the storage unit is vertically stationary and the conveyor belts are vertically adjustable in steps over a height equal to the distance between the top and bottom rotary platforms.

In order that the plane of the conveyor belts 6, 7 can be changed relative to the storage unit, the storage unit 1 can be vertically raised or lowered by means of the vertically adjustable nest 5, as depicted in FIG. 6. To enable this change to be carried out quickly, the conveyor belts 6, 7 can be arranged to swing about a pivot at one end thereof. The other end of the conveyor belt is raised or lowered in a stepwise manner by a hydraulic cylinder 13, for example, during the adjustment operation of the storage unit. This enables the loading or unloading of workpieces to be carried out simultaneously with the raising or lowering operation, that is, the end of the conveyor belt is raised or lowered as the storage unit is raised or lowered respectively by the distance separating adjacent rotary platforms. The end of the conveyor belt then returns to its initial position and is again raised or lowered in conjunction with the storage unit. In this manner the plane of the end of the conveyor belt is maintained substantially parallel to the plane of the rotary platform being accessed while that rotary platform is being raised or lowered. In this embodiment the vertical displacement of the end of the conveyor belt is equal to the vertical distance separating adjacent rotary platforms. Although not illustrated, it will be obvious to one of ordinary skill that during the return of the end of the conveyor belt to its initial position, loading or unloading of the workpieces is halted.

Figure 7:
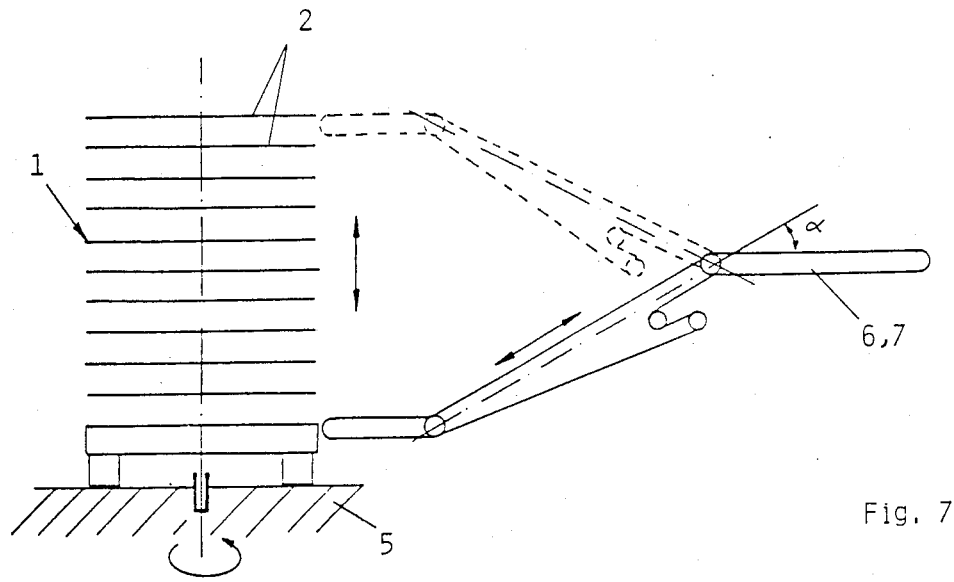
FIG. 7 is a side view of another preferred embodiment of the invention wherein the storage unit is vertically adjustable over a height equal to the distance between the top and bottom rotary platforms and the conveyor belts are vertically adjustable over a height equal to the distance between adjacent rotary platforms.

In the alternative preferred embodiment depicted in FIG. 7, the conveyor belts 6, 7 can be vertically adjusted over the entire height of the storage unit 1 and means are provided for adjusting the length of the conveyor belts so that the end of the conveyor belt is proximal to the periphery of the rotary platform being accessed for all elevations of the conveyor belt. For example, it would be obvious to one of ordinary skill to arrange roller 16 so that the bearing means slides in a vertical groove (not shown) and to construct roller 17 as a tension roller that maintains substantially constant tension in belt 18, whereby the length of the portion of belt 18 extending between roller 16 and 19 changes as the height of roller 16 changes. The vertical positioning of roller 16 is controlled by an actuating drive (not shown).

Figure 8:
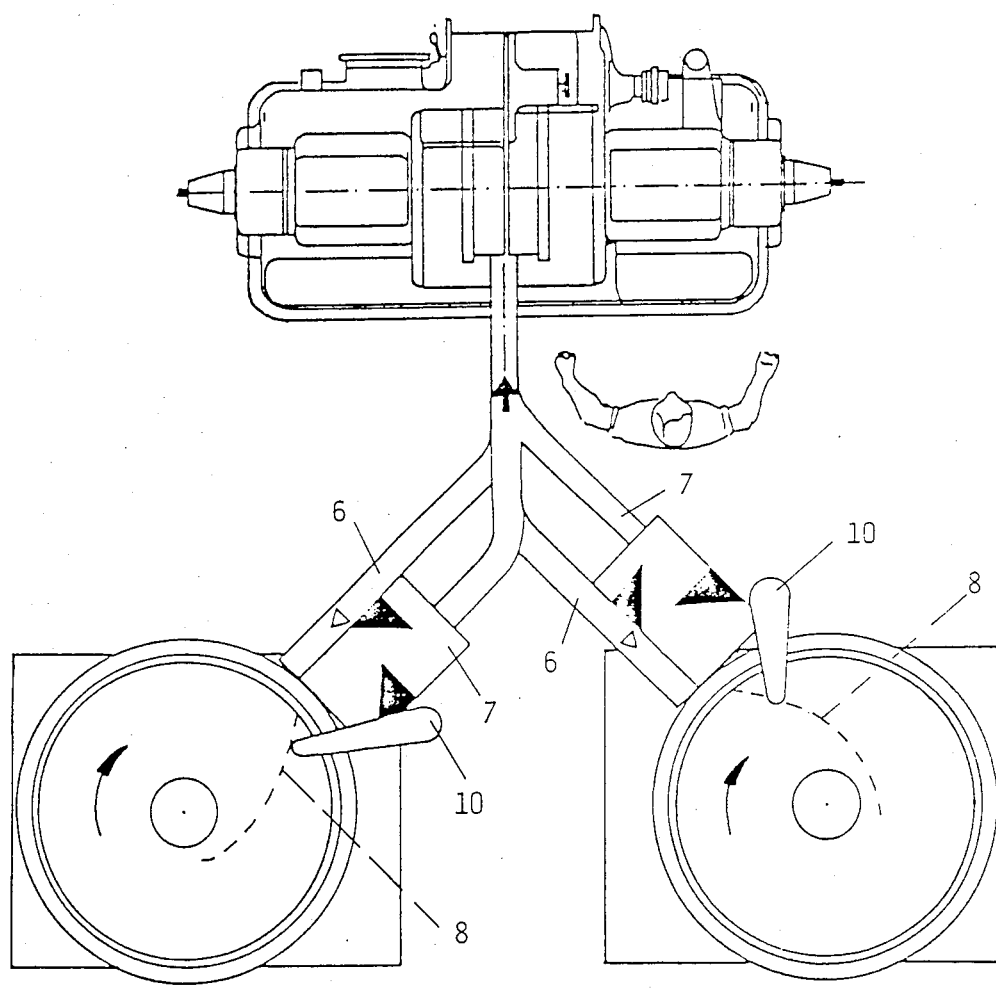
FIG. 8 is a top view of an installation having two storage units connected to a processing machine.

FIG. 8 shows a processing machine 20 whereby two storage units 1 are arranged with respective loading and unloading conveyor belts for conveying workpieces from and to the machine installation respectively. The conveyor belts 7 of the two storage units have a common portion closest to the processing machine, as do the conveyor belts 6. The common portion of the conveyor belt 7 is superimposed over the common portion of conveyor belt 6. In accordance with this arrangement, workpieces can be conveyed from one storage station to the other station by means of the machine installation which shunts the workpieces from the input conveyor belt to the output conveyor belt.

The foregoing description of the preferred embodiments is presented for illustration purposes only and is not intended to limit the scope of the invention as defined in the appended claims. Modifications may be readily effected by one having ordinary skill in the art without departing from the spirit and scope of the inventive concept herein disclosed.

What is claimed is:

1. A storage station for receiving workpieces from a loading conveying means and for sending workpieces to an unloading conveying means, said station having a plurality of spaced rotary platforms mounted on a common rotatable shaft, and means for adjusting the vertical position relative to said rotary platforms of the ends of said conveying means which are proximal to said station, the improvement wherein:
   (a) a first guide means is provided for each platform for directing workpieces riding on the outer radial region of the respective platform toward the inner radial region of that platform when said first guide means is in a first position, said first guide means being pivotally mounted at a point overlying the radially outer region of the respective platform and positioned downstream of the proximal end of said loading conveying means, and a movable end of said first guiding means being displaceable from a relatively inner radial position corresponding to said first position of said first guide means toward a relatively outer radial position when said first guide means swings radially outwardly from said first position to a second position, and
   (b) a means for resisting but not preventing radially outward swinging of said first guide means is provided for each platform.

2. The storage station for workpieces as defined in claim 1, further comprising second guide means for each platform for directing workpieces from said respective platform to the proximal end of said unloading conveying means, said second guide means being displaceable whereby an end of said second guide means can be displaced from a point overlying a relatively radially outer region of the respective platform to a point overlying a relatively radially inner region of the respective platform.

3. The storage station for workpieces as defined in claim 2, wherein said second guide means comprises a guide barrier disposed at an oblique angle relative to the instantaneous direction of travel of a workpiece riding on the rotating platform when that workpiece impinges on said guide barrier and relative to the direction of the unloading conveying means.

4. The storage station for workpieces as defined in claim 2, wherein said second guide means comprises a guide conveyor belt, the portion of said guide conveyor belt which engages said workpieces being disposed at an oblique angle relative to the instantaneous direction of travel of a workpiece riding on the rotating platform when that workpiece impinges on said guide conveyor belt and relative to the direction of the unloading conveying means.

5. The storage station for workpieces as defined in claim 1, wherein said loading conveying means and said unloading conveying means each comprise a conveyor belt.

6. The storage station for workpieces as defined in claim 1, wherein said first guide means comprises a sickle-shaped guide barrier.

7. The storage station for workpieces as defined in claim 6, wherein said guide barrier is made of resilient material.

8. The storage station for workpieces as defined in claim 7, wherein said resilient material is plastic.

9. The storage station for workpieces as defined in claim 7, wherein said resilient material is spring steel.

10. The storage station for workpieces as defined in claim 1, wherein the elevation of said loading and unloading conveying means is adjustable between two extreme positions separated by a height equal to the vertical interval between adjacent platforms, and the elevation of said common rotatable shaft is adjustable over a height equal to the vertical distance separating the top and bottom platforms.

11. The storage station for workpieces as defined in claim 1, wherein the elevation of said loading and unloading conveying means is adjustable over a height equal to the vertical distance separating the top and bottom platforms and the elevation of said common rotatable shaft is fixed.

12. The storage station for workpieces as defined in claim 11, further comprising means for adjusting the effective length of said loading and unloading conveying means as the elevation of said loading and unloading conveying means is adjusted to ensure that the end of said loading and unloading conveying means is proximal to the periphery of the platform being accessed.

* * * * *